(12) United States Patent
Hiss et al.

(10) Patent No.: US 6,832,527 B2
(45) Date of Patent: Dec. 21, 2004

(54) FLOW SENSOR

(75) Inventors: Eckart Hiss, Kiel (DE); Stefan Michelsen, Gettorf (DE)

(73) Assignee: Sensorentechnologie Gettorf GmbH, Gettorf (DE)

( * ) Notice: Subject to any disclaimer, the term of this patent is extended or adjusted under 35 U.S.C. 154(b) by 0 days.

(21) Appl. No.: 10/762,942

(22) Filed: Jan. 22, 2004

(65) Prior Publication Data

US 2004/0149028 A1 Aug. 5, 2004

(30) Foreign Application Priority Data

Jan. 22, 2003 (DE) .......................................... 103 02 251

(51) Int. Cl.$^7$ ................................................ G01F 1/00
(52) U.S. Cl. ....................................................... 73/861
(58) Field of Search .......................... 73/861, 861.357, 73/861.356, 861.355, 861.52, 861.04

(56) References Cited

U.S. PATENT DOCUMENTS 4,096,745 A * 6/1978 Rivkin et al. ............ 73/861.04
5,691,485 A * 11/1997 Endo et al. ............. 73/861.357
6,672,173 B2 * 1/2004 Bell ........................ 73/861.52

* cited by examiner

Primary Examiner—Edward Lefkowitz
Assistant Examiner—Jewel V Thompson
(74) Attorney, Agent, or Firm—Larson & Larson, PA; Herbert W. Larson

(57) ABSTRACT

A flow sensor with a tube through which flows a medium to be measured and a housing comprising a lower shell and an upper shell and receiving electronics with unions provided with a flow bore communicating with the tube and which are received in recesses made in facing sides of the lower shell and upper shell, wherein the unions have an outer part, an inner part and a central piece, the inner part of both unions is provided with a blind hole concentric to the flow bore, and in which are mounted the ends of the tube, and the central piece is constructed cylindrically with a reduced diameter compared with the parts of the unions, and the lower shell and upper shell are in each case provided with a semicylindrical portion receiving the central piece of the unions.

9 Claims, 2 Drawing Sheets

FLOW SENSOR

PRIOR APPLICATIONS

This application bases priority on German Application No. DE 103 02 251.1, filed Jan. 22, 2003.

BACKGROUND OF THE INVENTION

1. Field of the Invention

The invention relates to a flow sensor with a tube through which the medium to be measured flows and a housing comprising a lower shell and an upper shell and receiving measuring electronics with unions provided with a flow bore communicating with the tube and which are received in recesses made in facing sides of the lower and upper shells.

2. Description of the Prior Art

Numerous different designs of such flow sensors are known. DE 100 62 609 A1 discloses a flow sensor having the features described above. In the case of said flow sensor, the unions are constructed in one piece with the tube, which can be disadvantageous for certain applications because mechanical stresses, which can emanate from the housing or the unions, are transmitted to the tube.

The problem of the invention is to provide a flow sensor, in which mechanical stresses emanating from the housing or unions are not transmittable to the tube.

SUMMARY OF THE INVENTION

According to the invention, this problem is solved in that the union has an outer part, an inner part and a central piece, the inner part of both unions is provided with a blind hole concentric to the flow bore and in which are elastically mounted the ends of the tube, and the central piece is constructed cylindrically with a reduced diameter compared with the parts of the union and the lower shell and the upper shell are in each case provided with a semicylindrical portion receiving the central piece of the union.

One of the parts of the unions, and the areas of the facing sides of the lower and upper shells receiving the same, must not have a cylindrical construction.

Preferably the ends of the tube are mounted in the inner part of each of the unions by at least one first O-ring, sealing against the tube, located in a circumferential groove in the wall of the bore.

A preferred embodiment is characterized by at least one second O-ring, sealing against the central piece of the union made in the portion of the recesses receiving the central pieces of the unions.

The unions can be made from a plastics material and the inner part of the unions can, in each case, be embraced by a shape-stabilizing metal ring. A pin used to prevent turning and engaging in the wall of the lower shell or upper shell can be guided through the inner part of the unions.

DESCRIPTION OF THE DRAWINGS

Further features and advantages of the present invention can be gathered from the following descriptions of the preferred embodiment with reference to the attached drawings, wherein.

DETAILED DESCRIPTION OF THE PREFERRED EMBODIMENT

Figure 1:
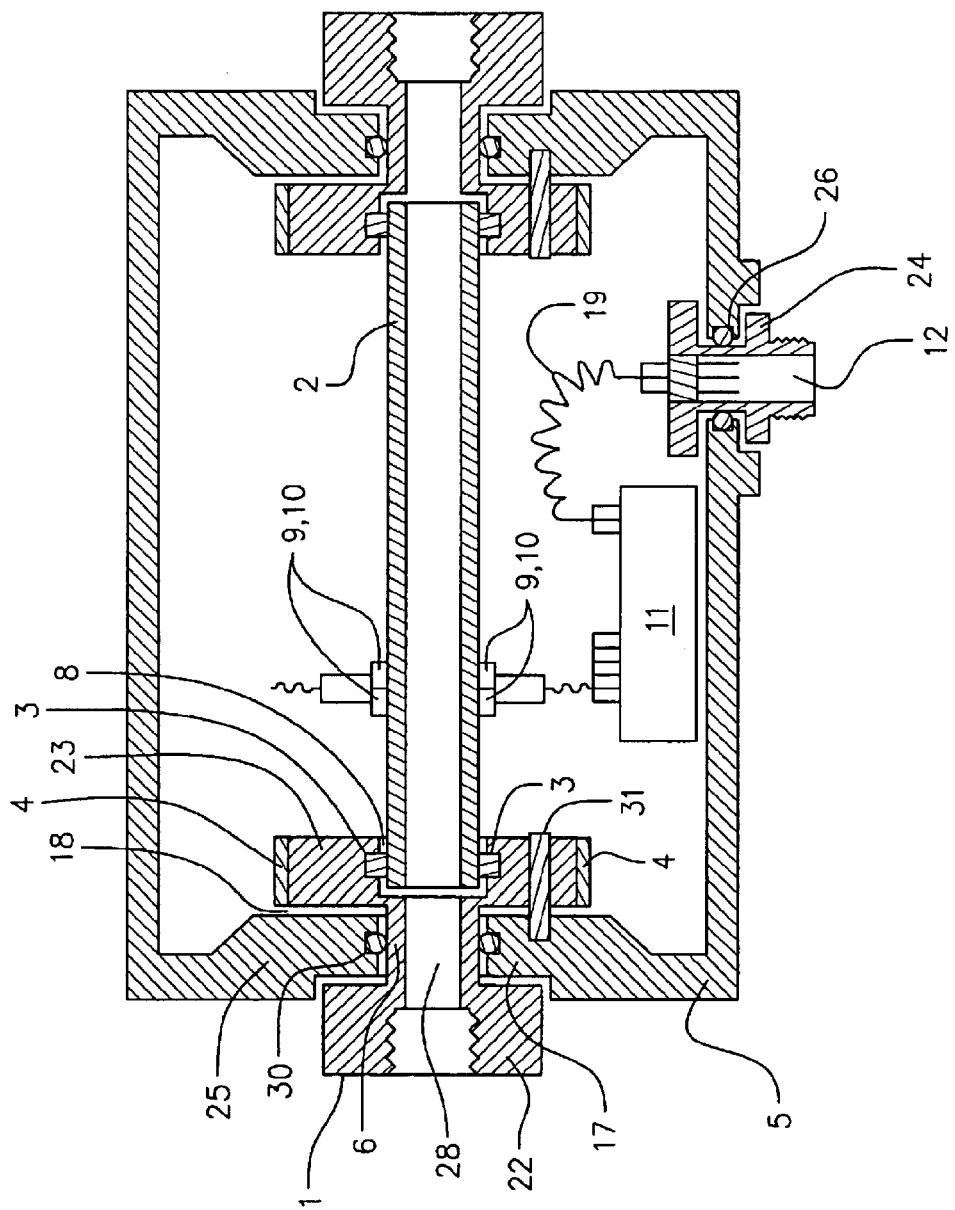
FIG. 1 shows a side sectional view of a first embodiment of the flow sensor of the present invention.

The flow sensor has a tube 2 through which the medium to be measured flows which is preferably made from a ceramic material or thin steel, and a housing comprising a lower shell 5 and an upper shell 25, and receiving the measuring electronics 11, and is provided with unions 1 having a flow bore 28 communicating with the tube 2, and which are received by recesses made in facing sides of the lower shell 5 and upper shell 25.

The unions 1 comprise an outer part 22, an inner part 23 and a central piece 6. The inner part 23 of both unions 1 is provided with a blind hole 8 concentric to the flow bore 28, and in which are elastically mounted the ends of the tube 2. With respect thereto, a circumferential groove is made in the wall of the hole 8 and in it is located a first O-ring 3 sealing against the tube 2. The mounting of the tube via the O-ring 3 in the hole 8, which is slightly larger than the external diameter of the tube 2, ensures that a twisting or bending of the housing formed by the shells 5, 25 is not transmitted to the tube. The latter is always located in a self-centering, unloaded manner in the hole 8, while maintaining a small clearance between the tube 2 and the hole 8.

In this embodiment, the outer part 22 of the unions 1 and the areas of the facing sides of the lower shell 5 and the upper shell 25 receiving the same, are not cylindrical, so that the unions 1 cannot twist relative to the housing formed by the upper shell 25 and the lower shell 5.

The central piece 6 is constructed cylindrically with a reduced diameter compared with parts 22, 23 of the unions 1 and the lower shell 5 and upper shell 25 are in each case provided with a semicylindrical portion 17 receiving the central piece 6 of the unions 1. At least one second O-ring 30 sealing against the central piece 6 of the unions 1 is made in portion 17 of the recesses.

When the unions 1 are made from plastic, the inner part 23 of the unions 1 is in each case embraced by a shape-stabilizing metal ring 4.

Through the inner part 23 of the unions 1 is introduced a pin 31, which prevents turning and which engages in the wall of the lower shell 5 or upper shell 25 (only shown in lower shell 5 in FIG. 1). The provision of such a pin 31 is an alternative to the non-cylindrical construction of one of the parts 22, 23 of the unions 1 and the shells 5, 25.

An electric socket 12 is inserted in the semicylindrical depressions in the side walls of the shells 5, 25 and connected by a line 19 to the measuring electronics 11 which is in turn connected to measuring elements 9 and 10 which are mounted to tube 2 as shown in FIG. 1.

Figure 2:
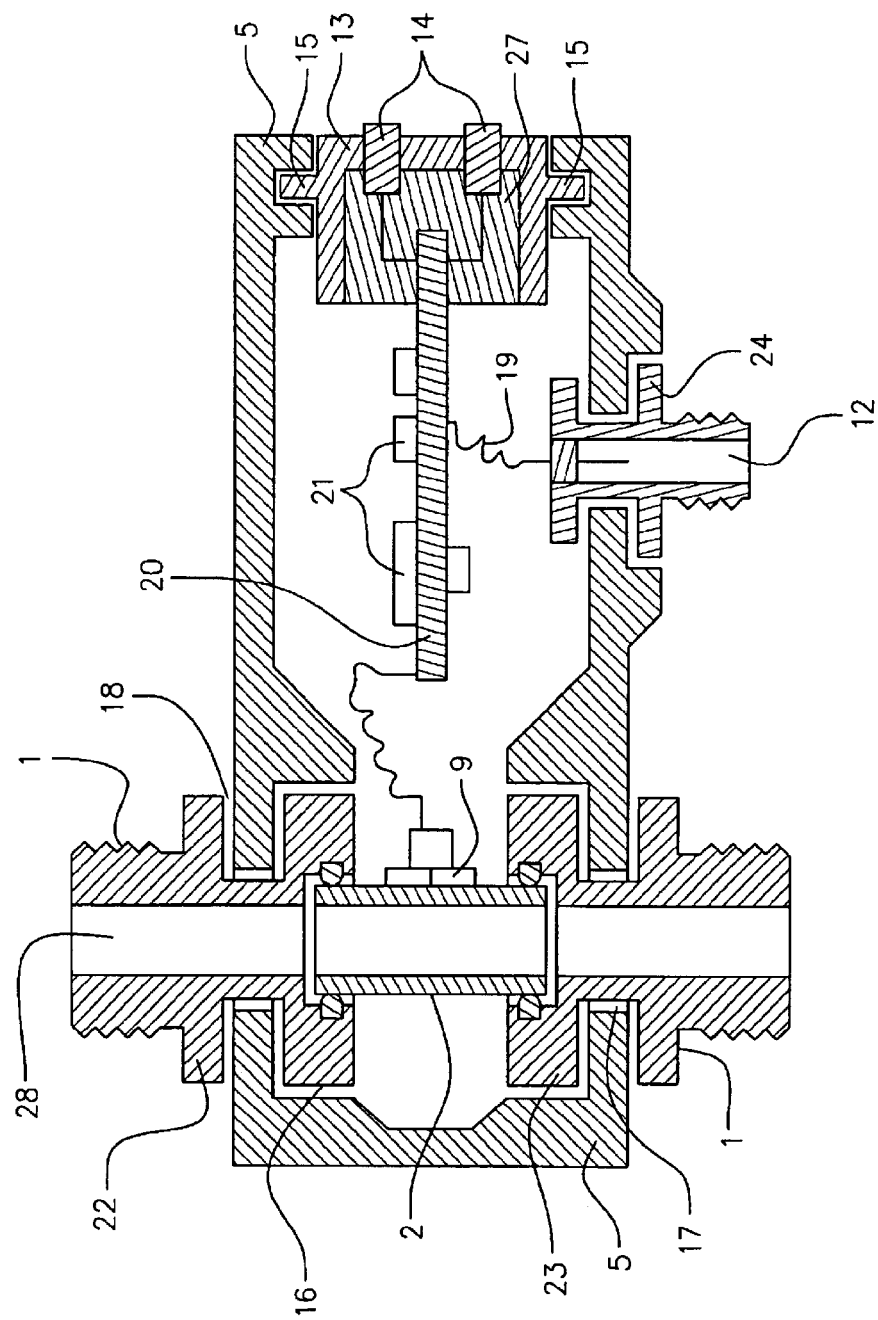
FIG. 2 shows a top plan sectional view of a second embodiment of the flow sensor of the present invention.

In the embodiment shown in FIG. 2, the unions 1 are inserted in side parts of the shells 5, 25 instead of end faces, although upper shell 25 is not shown in FIG. 2 in that FIG. 2 is a top plan sectional view having upper shell 25 cut away. The inner part 23 of the unions 1 of the areas of the shells 5, 25 receiving the same, are constructed with a complimentary projection 16.

In this embodiment, the electronic components 21, which cooperate with functional measuring elements 9 mounted on the tube 2, are fitted to a printed circuit board 20 and connected by a line 19 to the socket 12. A plug 13 is placed through tongues 15 into grooves of a recess in shells 5, 25. In the embodiment shown, the plug 13 retains the printed circuit board by a resin filling 27 and is provided with indicating elements 14 detachable from the outside.

The socket 12 is provided with an outer part 24, which rests in complimentary-constructed projections in shells 5 and 25, and in this way is prevented from turning.

Having thus described the invention, what is claimed and desired to be secured by Letters Patent is:

1. An improved flow sensor having a housing and a tube inserted there within for measuring a medium flowing through the tube, the housing having an upper and lower shell surrounding the tube and measuring electronics enclosed within the housing in communication with the tube, the tube having a flow bore formed therein through which the medium flows, the housing further including recesses formed in opposed side faces of the upper and lower shells for receiving a pair of unions located at opposed ends of the tube for maintaining the tube within the housing, the improved flow sensor comprising:

a) each union having an outer part, an inner part and a central piece located intermediate the union outer and inner parts, b) a blind hole formed in each union inner part concentric to the flow bore for receiving the tube opposed ends, and c) a pair of opposed portions of the upper and lower shells for receiving the union central pieces disposed proximal to the tube opposed ends.

2. The improved flow sensor of claim 1, further comprising:

a) a first groove formed along an inner circumference of each union inner part perpendicular to the tube, and b) a first o-ring inserted within each first groove for sealing each union inner part against each respective tube opposed end.

3. The improved flow sensor of claim 1, wherein the pair of opposed portions of the upper and lower shells are semi-cylindrical in shape and each union central piece is cylindrically shaped having a diameter less than that of each union outer and inner part.

4. The improved flow sensor of claim 1, further comprising:

a) a second groove formed in each opposed portion of the upper and lower shells surrounding the union central pieces perpendicular to the tube, and b) a second o-ring inserted within each second groove for sealing each union central piece against each respective opposed portion of the upper and lower shells.

5. The improved flow sensor of claim 1, further comprising a ring surrounding each union inner part.

6. The improved flow sensor of claim 5, wherein each union inner part is constructed from plastic material and each ring is constructed of metal, each metal ring acting as a shape-stabilizer for each plastic union inner part.

7. The improved flow sensor of claim 1, further comprising a pin inserted through one of the union inner parts for engaging the housing and for preventing any turning of the unions and the tube.

8. The improved flow sensor of claim 7, wherein the pin inserts through the union inner part and engages a bore formed in the housing lower shell.

9. The improved flow sensor of claim 7, wherein the pin inserts through the union inner part and engages a bore formed in the housing upper shell.

* * * * *